(12) United States Patent
Yamazaki

(10) Patent No.: US 7,075,775 B2
(45) Date of Patent: Jul. 11, 2006

(54) CHIP-TYPE ELECTRONIC COMPONENT

(75) Inventor: Youichi Yamazaki, Kokubu (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/140,512

(22) Filed: May 25, 2005

(65) Prior Publication Data

US 2005/0264975 A1    Dec. 1, 2005

(30) Foreign Application Priority Data

| May 27, 2004 | (JP) | 2004-158428 |
| Sep. 28, 2004 | (JP) | 2004-282381 |
| Sep. 28, 2004 | (JP) | 2004-282383 |
| Sep. 28, 2004 | (JP) | 2004-282392 |
| Feb. 24, 2005 | (JP) | 2005-049195 |
| Feb. 24, 2005 | (JP) | 2005-049196 |
| Feb. 24, 2005 | (JP) | 2005-049197 |

(51) Int. Cl.
 *H01G 4/228* (2006.01)

(52) U.S. Cl. .............. 361/306.3; 361/321.2; 361/301.3; 338/239; 338/237

(58) Field of Classification Search ............ 361/301.3, 361/301.4, 303, 306.1, 306.2, 306.3, 307–313, 361/321.2, 321.3, 361.4, 328–329; 338/237–240
See application file for complete search history.

(56) References Cited

U.S. PATENT DOCUMENTS

| 4,205,364 | A | * | 5/1980 | Pereira, Jr. ............... 361/274.1 |
| 4,750,084 | A | * | 6/1988 | Nikaidoh et al. ......... 361/321.2 |
| 5,277,723 | A | * | 1/1994 | Kodama et al. .......... 156/89.15 |
| 5,907,265 | A | * | 5/1999 | Sakuragawa et al. .......... 333/1 |
| 6,104,598 | A | * | 8/2000 | Duva ......................... 361/303 |
| 6,493,207 | B1 | | 12/2002 | Nakano et al. |

FOREIGN PATENT DOCUMENTS

| JP | 2000-114097 | 4/2000 |
| JP | 2003-022930 | 1/2003 |
| JP | 2003-318312 | 11/2003 |
| WO | 01/33588 | 5/2001 |

* cited by examiner

Primary Examiner—Anthony Dinkins
(74) Attorney, Agent, or Firm—Hogan & Hartson LLP

(57) ABSTRACT

In a chip-type electronic component of the present invention, at least one surface of a ceramic body is a convexly curved surface. Specifically, at least one surface in a thickness direction of the ceramic body may be convexly curved, and the side surface of the ceramic body may be concavely curved. Alternatively, only one surface may be a convexly curved surface. This chip-type electronic component has a high visibility and a high mechanical strength, though it is small. Moreover, in a chip-type electronic component comprising a ceramic body that is formed by alternately laminating insulating layers and conductor layers, and a pair of external electrodes, the thickness in a laminate direction at the central part between external electrodes of the ceramic body is made greater than the thickness of the end surface. This prevents breakage of the external electrodes and also enlarges the ceramic body.

12 Claims, 9 Drawing Sheets

CHIP-TYPE ELECTRONIC COMPONENT

BACKGROUND OF THE INVENTION

1. Field of the Invention

The present invention relates to chip-type electronic components and, in particular, small chip-type electronic components in the shape of an approximately rectangular solid, such as multilayer ceramic capacitors, inductors, resistors and semiconductor elements.

2. Description of Related Art

Recently, attempts to miniaturize electronic equipment and achieve high densification of mounting are being pursued. For example, as described in Japanese Patent Application Laid-Open Publication No. 2003-318312, chip-type electronic components having different characteristics, such as a capacitor, an inductor, a resistor, a semiconductor element, are mounted together on a substrate constituting the electronic equipment. As such a chip-type electronic component described in this publication (corresponding to a circuit element of Japanese Patent Application Laid-Open Publication No. 2003-318312), there is a small multilayer ceramic capacitor (2 mm in length; 1.25 mm in width; and 1.25 mm in thickness), which is for example described in Japanese Patent Application Laid-Open Publication No. 2000-114097.

Since there are a large variety of chips on the substrate as above described, the operations during mounting and repair are complicated. Consequently, there has been a proposal to describe, on the surface of a used chip-type electronic component, information such as its characteristic and its manufacturer's name. However, due to the high densification of the substrate and the miniaturization of the chip-type electronic component, it is difficult to make visible the information on the component surface.

Moreover, the miniaturized chip-type electronic component itself is of low mechanical strength. Therefore, there arises the problem that, when the chip-type electronic component is transported and mounted onto the substrate by an automatic machine, it may be broken depending on the grip strength, and the speed and strength when it is disposed on the substrate. In addition, since the edge portions and the like of the fired ceramic body have angularity, chipping is apt to occur at the time of mounting.

On the other hand, FIG. 14 is a schematic sectional view illustrating a conventional typical multilayer ceramic capacitor, which is described in No. 23, electronic components, C5101-10, JIS handbook 2001, edited by the Japanese Standards Association. As shown in FIG. 14, this multilayer ceramic capacitor has a pair of external electrodes 73 on the opposing end surfaces of a ceramic body 71. In such a multilayer chip-type electronic component, the outermost periphery dimension containing the external electrodes 73 is standardized. Specifically, a thickness t3 in the laminate direction of the ceramic body 71 is smaller than a thickness t4 in the same direction of the external electrodes 73, but the standardized dimension of the multilayer electronic component is specified by the above-mentioned thickness t4 of the external electrodes 73.

In manufacturing the multilayer ceramic capacitor, to achieve miniaturization and high capacity, the overall dimension is designed to be as small as possible by increasing the dimension of the ceramic body 71, which is a capacity generating part, as much as possible, and making the external electrode 73 as thin as possible.

However, if the external electrodes 73 are formed thin, ceramic body 71 as a capacitor generating part can be made large, but there arises the problem that, during mounting, solder erosion occurs at the external electrodes 73, and stripping of the external electrodes 73 are also apt to occur in the steps of mounting and transportation.

In contrast, when the external electrodes 73 are formed thick for preventing the occurrence of stripping, it is necessary to miniaturize the ceramic body 71, so that electrostatic capacity is suppressed to be low. Further, it is liable to have such a structure that the external electrodes 73 protrude from the external shape surface of the ceramic body 71. Therefore, there arises the problem that, at the time of shock such as drop, the external electrodes 73 are more liable to be an impact surface, so that these are susceptible to breakage.

SUMMARY OF THE INVENTION

A main advantage of the present invention is to provide a chip-type electronic component, though it is small, that exhibits a high visibility of information described on the component surface at the time of mounting.

Other advantage of the present invention is to provide a chip-type electronic component, though it is small, that has a high mechanical strength.

Still other advantage of the present invention is to provide a chip-type electronic component that can prevent loss such as chipping, though it is small.

Still other advantage of the present invention is to provide a chip-type electronic component, though it is small, that can prevent breakage of an external electrode by thickening the external electrode, and that can enlarge a ceramic body.

To achieve the above advantages, a chip-type electronic component of the present invention comprises a ceramic body having at its interior a conductor part. At least one surface of the ceramic body is a convexly curved surface. This permits to increase the area of the one surface of the ceramic body constituting the chip-type electronic component, so that it is able to describe chip information in a large character, and enlarge field of view, thereby facilitating confirmation of the chip during mounting operation by the aid of a magnifying glass or the like. Additionally, the increased amount of information described on the chip enables to obtain much information from the chip when the chip component is replaced at the time of repair, thereby permitting speedy and reliable repair.

Further, by the presence of the convexly curved surface on the one surface of the ceramic body, for example, even if the convexly curved surface is pressurized by a predetermined jig at the time of press in a strength test, the pressure can be dispersed to avoid mechanical damage such as breakage.

In accordance of the present invention, it is preferable that the above ceramic body is in the shape of an approximately rectangular solid, and that at least one surface in a thickness direction of the ceramic body is convexly curved, and the side surface of the ceramic body is concavely curved. Specifically, by having the concavely curved surface be adjacent to the one convex surface, the side surface of the ceramic body can be composed of an arched portion, so that the mechanical strength of the chip-type electronic component is further increased and the resistance to the strength test is improved.

Hence, the chip-type electronic component of the present invention is suitably used in small multilayer electronic components, such as multilayer ceramic capacitors, which are mounted in the largest number, for example, on a hybrid integrated circuit, and are transported and mounted at a high speed by an automatic machine, and which require mechanical strength that can withstand the step of mounting, etc.

Preferably, the above-mentioned convexly curved surface is formed by changing the thickness in a thickness direction along a width direction of the ceramic body. This produces roundness at the edge portions and corner portions in the ceramic body, even after firing. It is therefore possible to prevent the edge portions and the corner portions from causing loss such as chipping during handling in the steps of mounting and transportation. Additionally, by the presence of the roundness at the edge portions and the corner portions, a polishing step that is so-called barrel can be omitted. Preferably, the above-mentioned convexly curved surface is disposed so as to face to the upper surface of the chip-type electronic component.

Alternatively, only one surface may be a convexly curved surface in the present invention. For example, the surfaces other than the upper surface can be made flat, thereby exhibiting excellent mounting stability, though it is a small component.

A chip-type electronic component of the present invention further comprises a ceramic body comprising a plurality of insulating layers composed of ceramic, and conductor layers, which are alternately laminated; and a pair of external electrodes formed on both end surfaces of the ceramic body, and the external electrodes and the conductor layers being connected alternately. In the ceramic body, the thickness in a laminate direction at the central part between the external electrodes is greater than the thickness on the end surface part.

With this construction, the external electrodes can be formed sufficiently thick, without employing such a structure that the external electrodes protrude from the external shape surface of the ceramic body. Additionally, the surfaces of the external electrodes and the side surfaces of the ceramic body can be formed in nearly the same surface. It is therefore possible, at the time of shock such as drop, to reduce the shock received by the external electrodes only, thereby preventing loss and breakage due to the shock at the time of drop. Further, since there is no need of reducing the thickness of the external electrodes, it is possible to prevent the solder erosion of the external electrodes during mounting, and the stripping of the external electrodes that can occur in the steps of mounting and transportation, etc.

DETAILED DESCRIPTION OF PREFERRED EMBODIMENTS

First Preferred Embodiment

Figure 1:
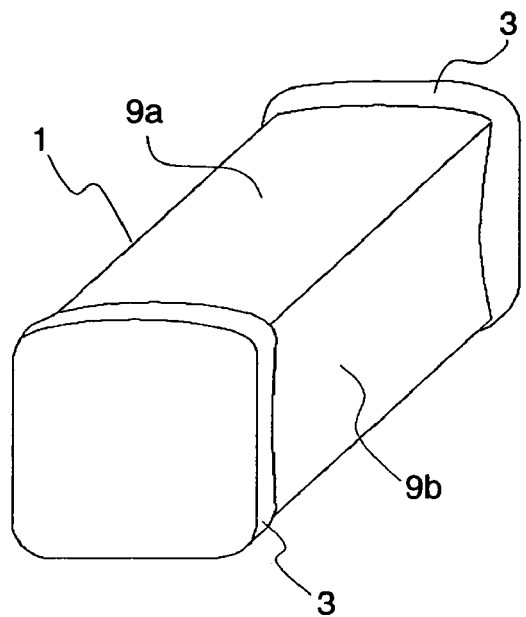
FIG. 1 is a schematic perspective view showing a chip-type electronic component according to the first preferred embodiment of the present invention.
Figure 2:
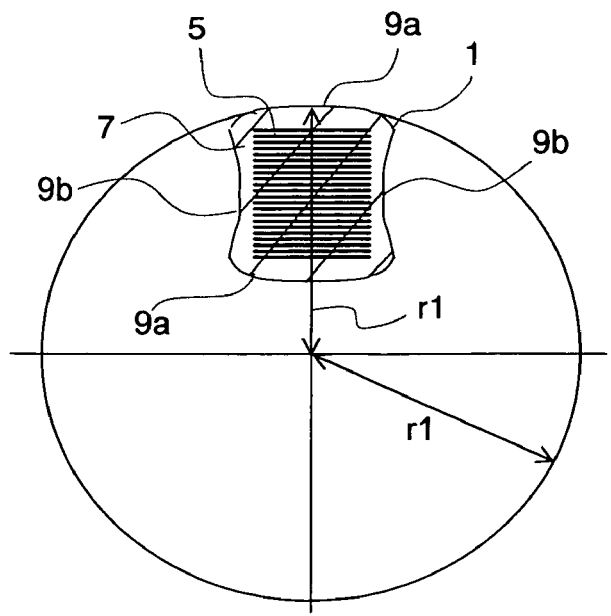
FIG. 2 is a schematic sectional view for explaining a radius of curvature r1 of a convexly curved surface according to the first preferred embodiment of the present invention.
Figure 3:
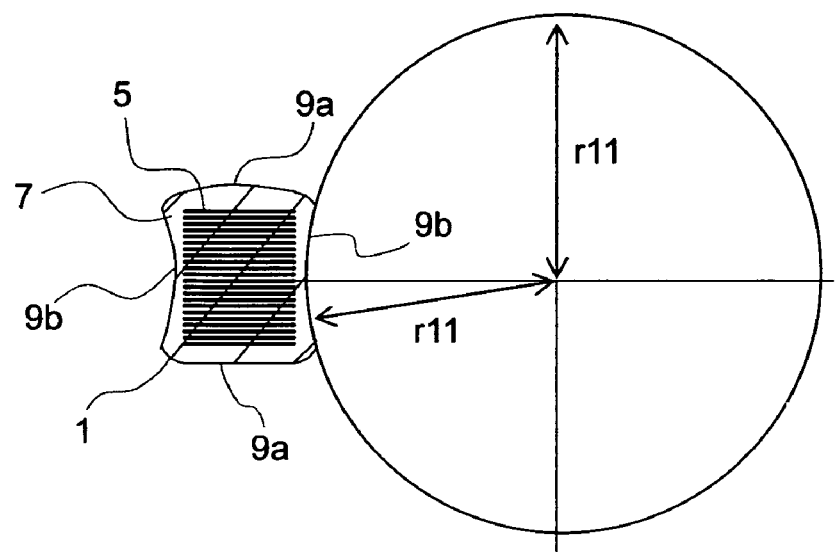
FIG. 3 is a schematic sectional view for explaining a radius of curvature r11 of a concavely curved surface according to the first preferred embodiment of the present invention.

A chip-type electronic component of the present invention, in particular, taking a multilayer ceramic capacitor as example, will next be described in detail with reference to the accompanying drawings. FIG. 1 is a schematic perspective view of a chip-type electronic component according to this preferred embodiment. FIG. 2 is a schematic sectional view for explaining a radius of curvature r1 of a convexly curved surface. FIG. 3 is a schematic sectional view for explaining a radius of curvature r11 of a concavely curved surface.

This chip-type electronic component has a pair of external electrodes 3 at end portions of a ceramic body 1 and a conductor part 5 at its interior, and it presents a rectangular solid appearance under bird's eye viewing. In the present invention, a surface (one surface or both surfaces) in a thickness direction (laminate direction) of the ceramic body 1 is convexly curved, and both side surfaces are concavely curved with respect to the convex surface. It is especially preferable that the upper and lower surfaces and the both side surfaces of the ceramic body 1 are convexly curved (a curved surface 9a) and concavely curved (a curved surface 9b), respectively. The above-mentioned surfaces (and side surfaces) are the surface constituting the ceramic body 1.

More specifically, as shown in FIG. 2 and FIG. 3, it is desirable that a plurality of insulating layers 7 composed of ceramic and conductor parts 5 are laminated alternately in the ceramic body 1. It is preferable that the ceramic body 1 has a volume of not more than 8 mm$^3$, preferably not more than 5.5 mm$^3$, and that the radii of curvature r1 and r11 of the surfaces of the curved surfaces 9a and 9b are not more than 50 mm. The radii of curvature r1 and r11 may have the same value or different values.

If the ceramic body 1 constituting the chip-type electronic component does not have the curved surfaces 9a and 9b, the area of the surface of the ceramic body 1 is small and it is difficult to describe chip information in a large character. This narrows field of view, thereby making it difficult to confirm a chip component during mounting operation by the aid of a magnifying glass or the like. Moreover, when the chip component is replaced at the time of repair, the information that the chip component presents is slight, thus failing to perform speedy and reliable repair. Furthermore, in the case where the surface is pressurized by a predetermined jig when applying pressure in a strength test, the pressure is less susceptible to dispersion, so that mechanical damage such as breakage is apt to occur, and electronic components are apt to be broken during mounting, transportation, and assembly.

Figure 4:
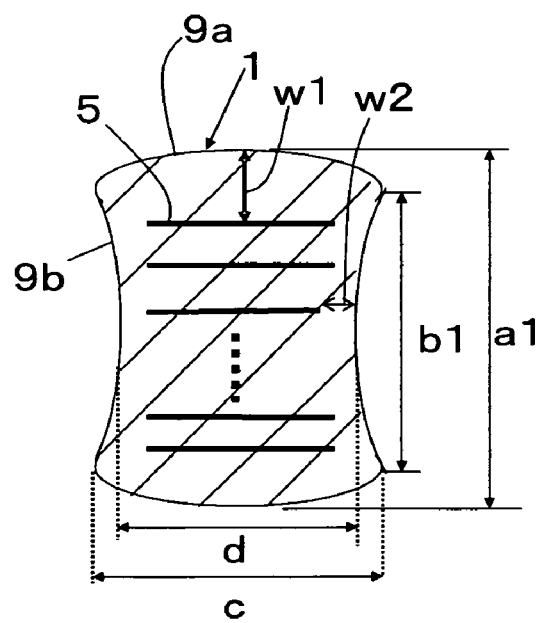
FIG. 4 is a schematic sectional view showing a method for evaluating the expansion coefficient in a laminate direction (thickness direction) and that in a width direction in a chip-type electronic component according to the first preferred embodiment of the present invention.

FIG. 4 is a schematic sectional view showing a method for evaluating the expansion coefficient in a laminate direction (thickness direction) and that in a width direction of a chip-type electronic component.

An expansion coefficient x1 in the laminate direction can be expressed by the following expression: $x1=\{(a1-b1)/b1\}\times100$, wherein a is the longest length in the laminate direction of the conductor part 5 in the ceramic body 1; and b is a length in the laminate direction at the side surface of the ceramic body 1, to which the conductor part 5 is not exposed. To increase the breaking strength of the chip-type electronic component, the expansion coefficient x1 is greater than 0%, preferably greater than 1%, more preferably greater than 5%. Here, a1>b1 is preferred.

An expansion coefficient y in a width direction can be expressed by the following expression: $y=\{(d-c)/c\}\times100$, wherein d is the shortest length in the width direction; and c is a length between the end portions of the ceramic body 1 in the same direction. To increase the breaking strength of the chip-type electronic component, the expansion coefficient y is greater than 0% in absolute value, preferably greater than 1% in absolute value, more preferably greater than 5% in absolute value. When the chip-type electronic component is small, an extremely great expansion coefficient y deteriorates mounting stability. Therefore, y<10 is preferred for satisfying the characteristics of mounting stability, breaking strength, and visibility, etc. Here, d<c is preferred.

Moreover, it is preferable that the radii of curvature r1 and r11 of the surfaces of the curved surfaces 9a and 9b of the ceramic body 1 are respectively not more than 50 mm. Thus, in accordance with the present invention, the breaking strength of the chip-type electronic component can be increased by maintaining the above respective relationships in terms of the expansion coefficients defined by x1 and y, and the radius of curvature.

In addition, it is desirable that the curved surfaces have different color tones from other surface, that is, the curved surfaces 9a and 9b have different color tones; or that their own colors are different each other in terms of contrast. To let the curved surfaces 9a and 9b have different color tones from other surface, distances w1 and w2, from the end portion of the conductor part 5 in the interior to the surface of the ceramic body 1 are adjusted to different dimensions. For example, the distance w1 from the uppermost layer of the conductor part 5 to the curved surface of the ceramic body 1 in FIG. 4 is made smaller than the distance w2 between the end portion of the conductor part 5 and the side surface of the ceramic body 1, so that a color tone difference can be formed depending on the degree in which the conductor part 5 is seen through the ceramic-body 1. This improves the visibility of information and facilitates distinction of the curved surfaces 9a and 9b.

Figure 5:
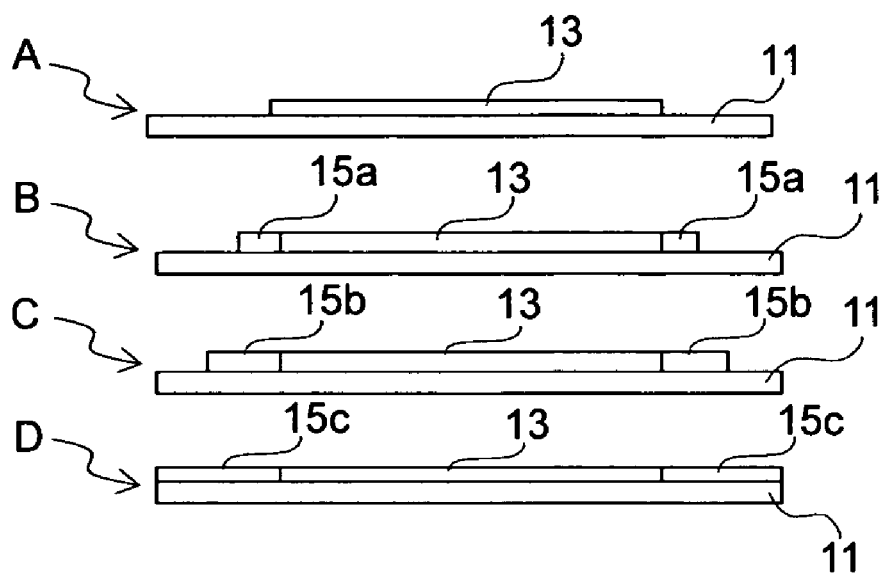
FIGS. 5(a) and 5(b) are schematic diagrams showing a method of manufacturing a chip-type electronic component according to the first preferred embodiment of the present invention.
Figure 5:
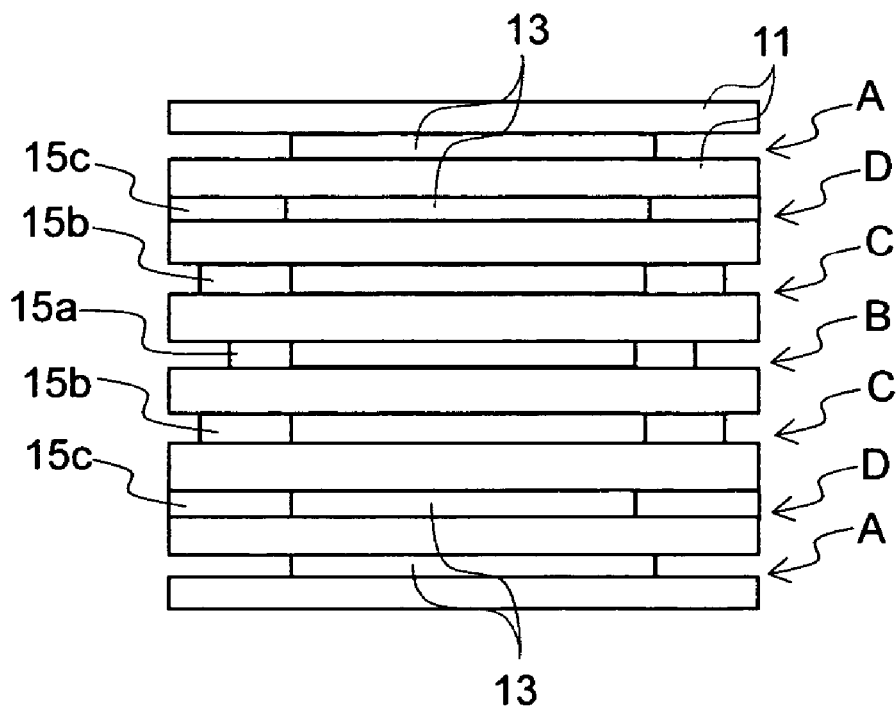

FIGS. 5(a) and 5(b) are schematic diagrams showing a method of manufacturing a chip-type electronic component according to this preferred embodiment. Referring now to FIG. 5(a), a rectangular conductor pattern 13 is formed on a green sheet 11 containing ceramic powder. In FIG. 5(a), there are prepared patterns A, B, C, and D. Specifically, in the pattern A, only the conductor pattern 13 is formed on the green sheet 11. In the patterns B, C, and D, ceramic patterns 15a, 15b, and 15c, which are of the same material as the green sheet and have different dimensions, are respectively formed around the conductor pattern 13 formed on the green sheet 11, thereby eliminating the gap of the conductor pattern 13.

Next, the green sheets 11 of the patterns A to D are laminated in the combination shown in FIG. 5(b), such that a surface of a ceramic body forming body is curved in a predetermined shape, and then cut in a predetermined shape, thereby to obtain a ceramic body forming body that has at its interior the conductor patterns 13. The obtained ceramic body forming body is then pressed and heated by using rubber press, etc. This ceramic body forming body is then fired to prepare a ceramic body that has at its interior a conductor part.

Specifically, the green sheets 11 are preferably laminated such that the patterns B, C, D, and A are disposed in the order named toward the upper part and the lower part of the central part of a multilayer body. This enables to form the convexly curved surface 9a and the concavely curved surface 9b. The number of multilayers of the green sheets 11 is generally in the range of about 15 to 400. The number of the green sheets 11 per pattern, and the combination may be determined within this range. The expansion coefficient and the radius of curvature can be adjusted depending on the number of multilayers, and the pressure applied when pressing the forming body.

In the final step, for example, external electrodes are formed at both end portions of the above-mentioned ceramic body, thereby completing a multilayer ceramic capacitor.

Second Preferred Embodiment

Figure 6:
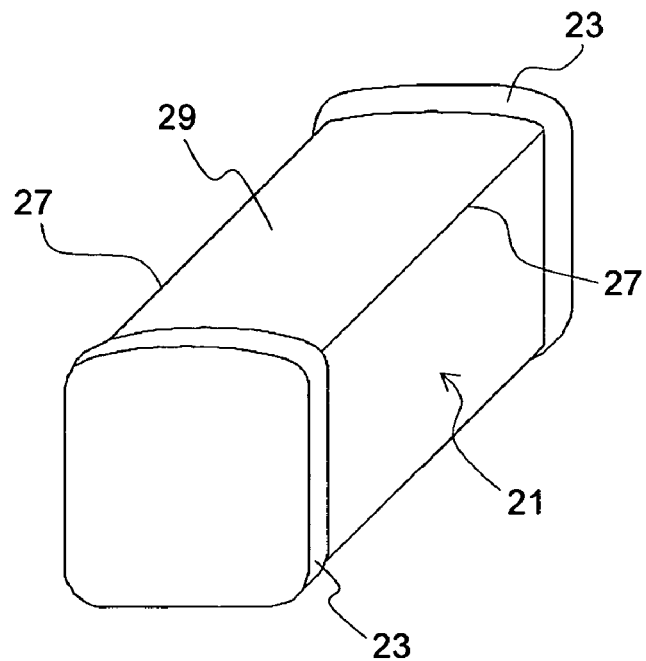
FIG. 6 is a schematic perspective view showing a chip-type electronic component according to the second preferred embodiment of the present invention.
Figure 7:
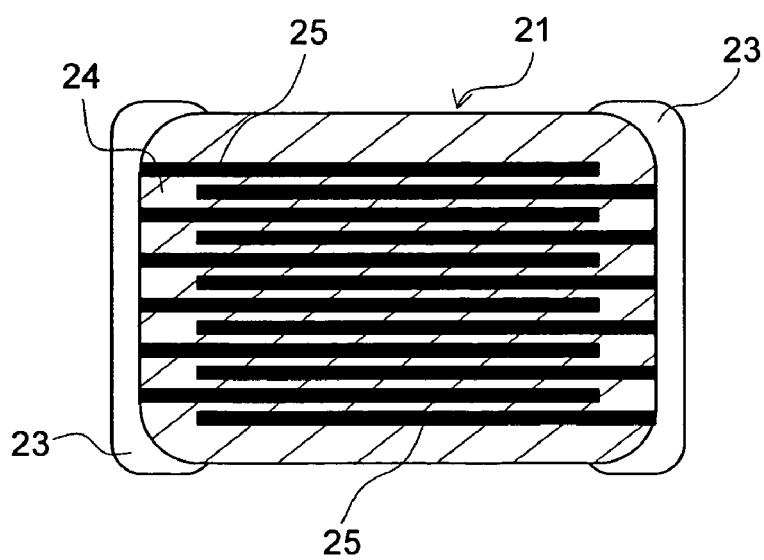
FIG. 7 is a schematic sectional view showing a chip-type electronic component according to the second preferred embodiment of the present invention.

A chip-type electronic component according to other preferred embodiment of the present invention, in particular, taking a multilayer ceramic capacitor as example, will next be described in detail with reference to the accompanying drawings. FIG. 6 is a perspective view showing the chip-type electronic component of this preferred embodiment, and FIG. 7 is its schematic sectional view. This chip-type electronic component has a conductor part 25, which is disposed via an insulating layer 24 in the interior of a ceramic body 21, and a pair of external electrodes 23, 23 at its end portions. This chip-type electronic component presents a rectangular solid appearance under bird's eye viewing. It is especially important that at least one surface containing a long edge side 27 of the ceramic body 21 has a convexly curved surface 29. In this preferred embodiment, the convexly curved surface 29 is formed only on the upper surface of the ceramic body 21. The above-mentioned surface is the surface constituting the ceramic body 21.

The ceramic body 21 is as small as not more than 1 mm³ in volume. Preferably, the ceramic body 21 is composed of a plurality of insulating layers 24, and the conductor part 25 is interposed between the insulating layers 24.

In contrast, if the ceramic body 21 does not have the curved surface 29, the area of the surface of the ceramic body 21 is small, and hence it is impossible to describe chip information in a large character, and filed of view is narrowed. This makes it difficult to confirm the chip component at the operation of mounting by the aid of a magnifying glass or the like. Due to slight described information, when the chip component is replaced during repair, the information that the chip component presents is slight, thus failing to perform speedy and reliable repair. Further, chipping is apt to occur because the edge portions have angularity.

Figure 8:
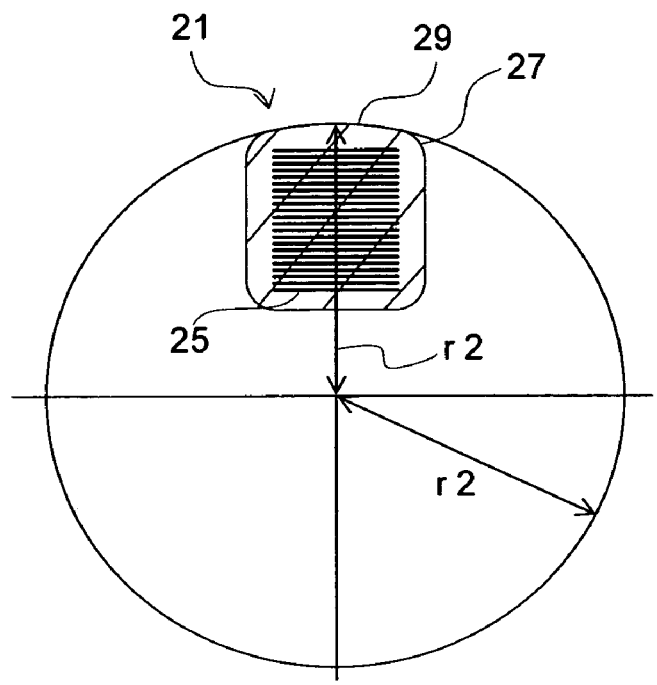
FIG. 8 is a schematic sectional view for explaining a radius of curvature r2 of a curved surface according to the second preferred embodiment of the present invention.
Figure 9:
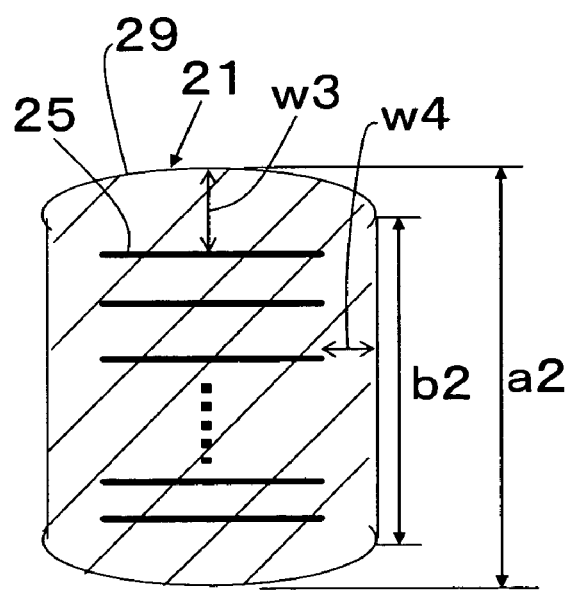
FIG. 9 is a schematic sectional view showing a method for evaluating expansion coefficient in a laminate direction of a chip-type electronic component according to the second preferred embodiment of the present invention.

FIG. 8 is a schematic sectional view for explaining a radius of curvature r2 of a curved surface. FIG. 9 is a schematic sectional view showing a method of evaluating expansion coefficient in a laminate direction of a chip-type electronic component.

As shown in FIG. 9, the expansion coefficient x2 in the laminate direction can be expressed by the following expression: $x2=\{(a2-b2)/b2\} \times 100$, wherein a2 is the longest length in the laminate direction in the vicinity of the central part in a vertical surface with respect to the direction of opposing external electrodes 23; and b2 is a length in the laminate direction on the side surface at the end portion of the ceramic body 21. To increase the breaking strength of the chip-type electronic component, the expansion coefficient x2 is greater than 0%, preferably greater than 1%, more preferably greater than 5%.

Additionally, from the standpoint of visibility and chipping prevention, it is more preferable that the radius of curvature r2 of the surface of the ceramic body 21 shown in FIG. 8 is not more than 5 mm. For example, in order to facilitate to distinguish the curved surface in the laminate direction from a flat side surface, it is desirable that the curved surface 29 has a different color tone from other surface, or that its color itself is different in terms of contrast.

To let the curved surface 29 have a different color tone from other surface, distances w3 and w4 from the end portion of the conductor part 25 disposed in the interior to the surface of the ceramic body 21 are adjusted to different dimensions. Specifically, for example, the distance w3 from the uppermost layer of the conductor part 25 to the curved surface of the ceramic body 21 in FIG. 9 is made smaller than the distance w4 between the end portion of the conductor part 25 and the side surface of the ceramic body 21, so that a color tone difference can be formed depending on the degree in which the conductor part 25 is seen through the ceramic body 21.

FIGS. 10(a) to 10(c) are schematic diagrams showing a method of manufacturing a chip-type electronic component according to the second preferred embodiment. Referring now to FIG. 10(a), a rectangular conductor pattern 33 is formed on a green sheet 31 containing ceramic powder. In a pattern E, only the rectangular conductor pattern 33 is formed on the green sheet 31. In a pattern F, a ceramic pattern 35 having the same material as the green sheet 31 is formed around the conductor pattern 33 formed on the green sheet 31, thereby eliminating the gap of the conductor pattern 33.

For example, in the combinations shown in FIGS. 10(b) and 10(c), a plurality of these patterns are then laminated such that a surface of a ceramic body forming body is curved in a predetermined shape, and then cut in a predetermined shape, thereby to obtain a ceramic body forming body having at its interior the conductor patterns 33. The obtained ceramic body forming body is then pressed and heated by using a rubber press, etc. This ceramic body forming body is then fired to prepare the ceramic body 21 that has at its interior the conductor part 25, as shown in FIG. 7 and FIG. 8.

In the final step, for example, a pair of external electrodes 23 are formed at both end portions of the ceramic body 21, thereby completing the multilayer ceramic capacitor of the present invention.

In the combination of FIG. 10(b), a plurality of the green sheets 31 of the pattern F are laminated. The green sheet 31 of the pattern E is laminated on the upper and lower surfaces of the obtained multilayer body of the pattern F, and the green sheet containing no conductor pattern 33 is further disposed on the upper surface. This enables to form the curved surface 29 on the upper and lower surfaces.

On the other hand, in the combination of FIG. 10(c), a plurality of the green sheets 31 of the pattern F are laminated. The green sheet 31 of the pattern E and the green sheet containing no conductor pattern 33 are disposed only on the upper surface of the obtained multilayer body of the pattern F. This enables to form the curved surface 29 only on the upper surface. This preferred embodiment otherwise is the same as the foregoing preferred embodiment.

Third Preferred Embodiment

Figure 11:
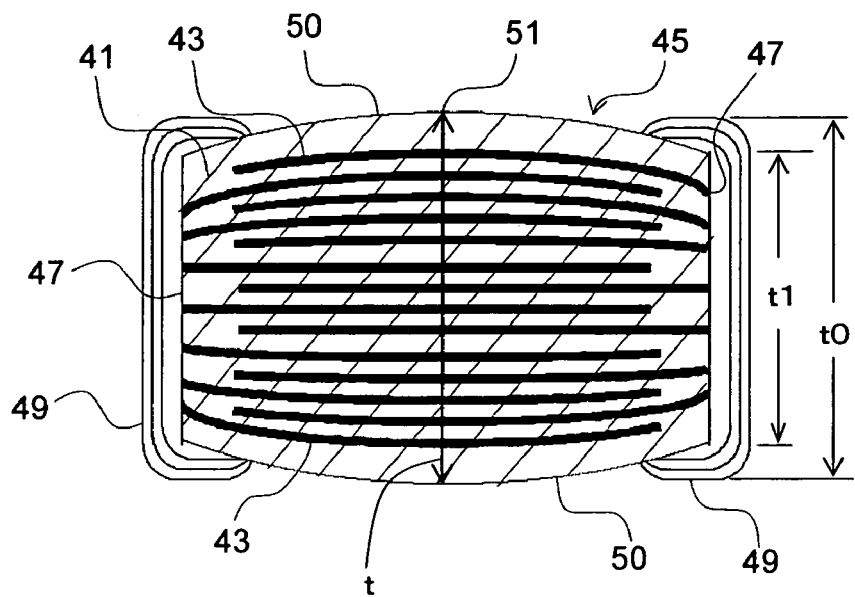
FIG. 11 is a schematic sectional view showing a chip-type electronic component according to the third preferred embodiment of the present invention.

A still other preferred embodiment of the present invention, in particular, taking a multilayer ceramic capacitor as example, will next be described in detail with reference to the accompanying drawings. FIG. 11 is a schematic sectional view showing a chip-type electronic component of this preferred embodiment.

As shown in FIG. 11, this chip-type electronic component has a ceramic body 45, which is formed by laminating alternatively a plurality of insulating layers 41 composed of ceramic (ceramic layers) and conductor layers 43. A pair of external electrodes 49, 49, in which the conductor layers 43 are connected alternately, are formed on both end surfaces 47 of the ceramic body 45, respectively.

In this preferred embodiment, a thickness t in a laminate direction at a central part 51 between the external electrodes 49 of the ceramic body 45 is greater than a thickness t1 on the end surface 47. Specifically, it is more preferable to satisfy the following relationship: $t \geqq t0$, wherein t is a maximum thickness in the laminate direction of the ceramic body 45; and t0 is a maximum width of the external electrode 49 in the same direction as the laminate direction of the ceramic body 45. Here, the width t0 of the external electrode 49 indicates a maximum width in the same direction as the laminate direction of the ceramic body 45, as illustrated in FIG. 11.

This preferred embodiment presents a rectangular solid appearance under bird's eye viewing. In particular, at least one surface containing an edge side in a length direction of the ceramic body 45 has a convexly curved surface 50. Specifically, as described above, the central part 51 between the external electrodes 49 of the ceramic body 45 has the convexly curved surface 50 when viewed in cross section in the laminate direction. That is, in the multilayer electronic component of the present invention, it is more desirable that the thickness in the laminate direction between the external electrodes 49 of the ceramic body 45 is gradually increased from the end surface 47 to the central part 51, as shown in FIG. 11. The above-mentioned surface is the surface constituting the ceramic body 45.

The ceramic body 45 may be small only in the thickness t1 at the end portion of an external electrode forming part, instead of having the above-mentioned curved surface.

In contrast, if the maximum thickness t at the central part 51 of the ceramic body 45 is not greater than the thickness t1 on the end surface 47, namely, in the shape of such a rectangular solid as has been conventional, it is liable to have such a structure that the external electrodes 49 protrude from the external shape surface of the ceramic body 45. Therefore, at the time of shock such as drop, the external electrodes 49 are more liable to be an impact surface, so that the external electrodes 49 are susceptible to breakage. If the external electrodes 49 are formed thick for suppressing the breakage of the external electrodes 49, in order to comply with a standardized dimension, it is necessary to miniaturize the ceramic body 45, thereby lowering electrostatic capacity.

Figure 12:
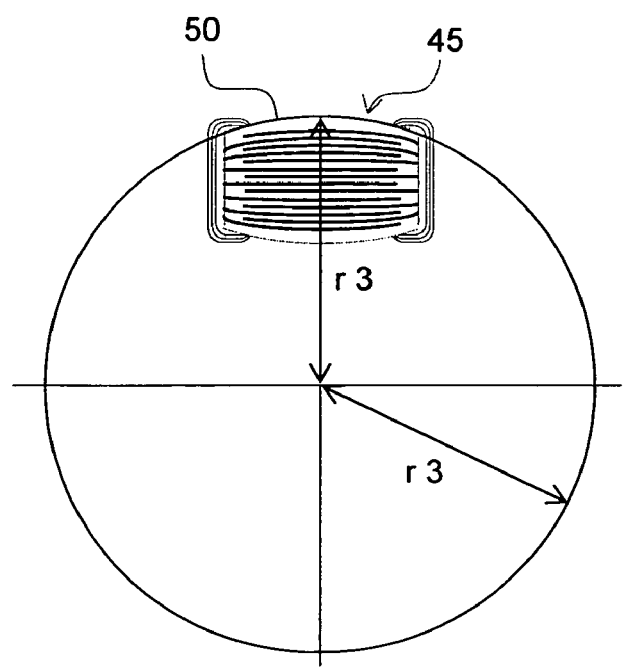
FIG. 12 is a schematic sectional view for explaining a radius of curvature r3 of a curved surface according to the third preferred embodiment of the present invention.

FIG. 12 is a sectional view showing the radius of curvature of a curved surface vertical to the laminate direction of the ceramic body 45. To make the present invention more effective, it is preferable that the ceramic body 45 is of a small shape, specifically, a volume of not more than 8 mm$^3$, particularly not more than 5.5 mm$^3$. It is also desirable that a radius of curvature r3 of the curved surface 50 is not more than 50 mm. Examples of such a component are multilayer inductors, multilayer actuators, and resistors, without limiting to the above-mentioned multilayer ceramic capacitor.

As shown in FIG. 11, the expansion coefficient x3 in the laminate direction of the ceramic body 45 can be expressed by the following expression: $x3=\{(t-t1)/t1\}\times100$, wherein t is a maximum length in a laminate direction in the vicinity of the central part in a surface vertical to the direction in which the conductor layer 43 extends; and t1 is a length in a laminate direction at the end portion of the ceramic body 45. The expansion coefficient x3 is greater than 0%, preferably greater than 1%, more preferably greater than 5%.

Figure 13:
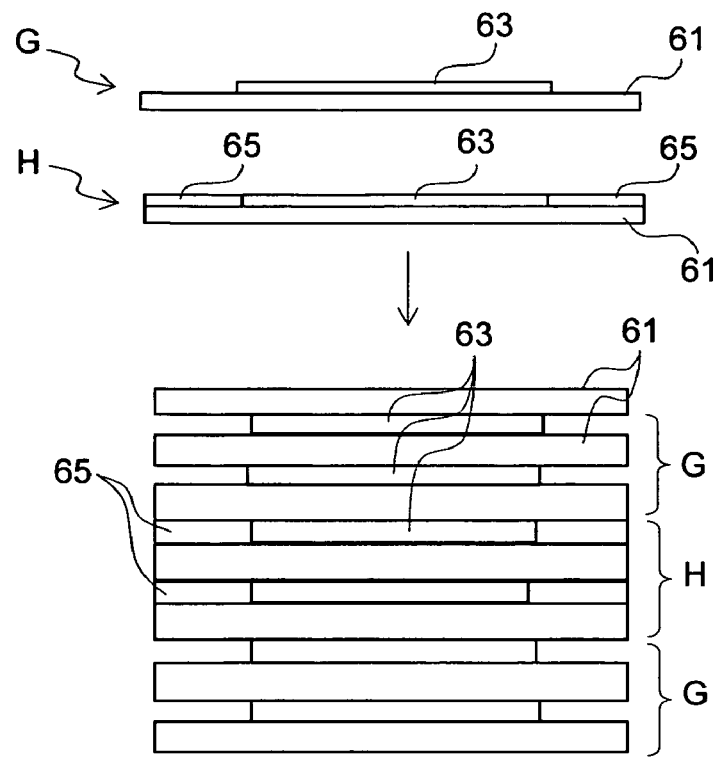
FIGS. 13(a) and 13(b) are schematic diagrams showing a method of manufacturing a chip-type electronic component according to the third preferred embodiment of the present invention.
Figure 13:
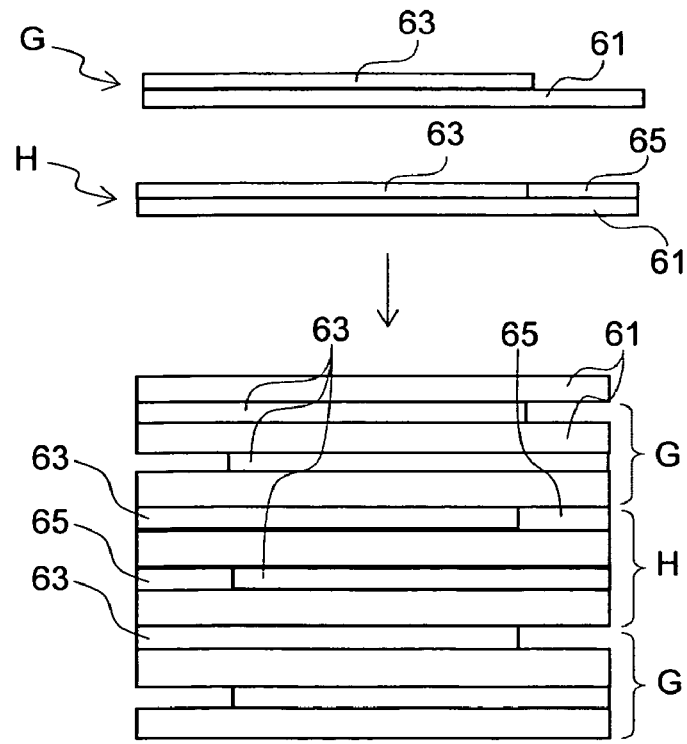

FIGS. 13(*a*) and 13(*b*) are schematic diagrams showing a method of manufacturing a chip-type electronic component according to the third preferred embodiment. Specifically, FIG. 13(*a*) shows the manufacturing method when a green sheet 61 and its multilayer forming body are viewed from the end surface; and FIG. 13(*b*) is the manufacturing method when viewed from the side surface.

First, a rectangular conductor pattern 63 is formed on a green sheet 61 containing ceramic powder. In a pattern G, only the rectangular conductor pattern 63 is formed on the green sheet 61. In a pattern H; a ceramic pattern 65 having the same material as the green sheet 61 is formed around the conductor pattern 63 formed on the green sheet 61, thereby eliminating the gap of the conductor pattern 63.

Next, the green sheets 61 of the patterns G and H are laminated in the combinations shown in FIG. 13(*a*), 13(*b*), and then cut in a predetermined shape, thereby to obtain a ceramic body forming body that has at its interior the conductor patterns 63. Specifically, in FIGS. 13(*a*) and 13(*b*), the green sheet 61 of the pattern H is disposed at the central part and the green sheet 61 of the pattern G on its both surfaces, so that a surface of the ceramic body forming body is curved in a predetermined shape. At this time, as shown in FIG. 13(*b*), the positions of the conductor patterns 63 on the respective green sheets 61 are disposed alternately oppositely, such that the conductor layers 43 are alternately exposed from the end surface.

After forming, the obtained ceramic body forming body is pressed and heated by using rubber press, etc. The ceramic body forming body is then fired to prepare a ceramic body having at its interior a conductor part. In the final step, for example, external electrodes are formed at the end portions of this ceramic body, thereby completing a multilayer ceramic capacitor according to the present invention. This preferred embodiment otherwise is the same as the foregoing preferred embodiment.

While the foregoing preferred embodiments describe the multilayer ceramic capacitors as example of electronic components of the present invention, the electronic components of the present invention are not limited to the multilayer ceramic capacitors, and are suitably applicable to multilayer inductors, multilayer actuators, and resistors, etc.

EXAMPLE I

[Preparation of Chip-Type Electronic Component]

A chip-type electronic component basically having the structure shown in FIG. 1 was prepared and evaluated. There was first prepared a dielectric green sheet having a thickness of 3 μm that contains dielectric powder mainly composed of barium titanate powder. A conductor paste mainly composed of Ni was printed in a thickness of 1 to 1.5 μm on the upper surface of this dielectric green sheet, thereby preparing green sheets of the patterns A, B, C, and D shown in FIG. 5, respectively. These green sheets were then laminated to obtain a variety of forms, and a predetermined number of 10 μm thick dielectric green sheets, on which no conductor pattern was printed, were laminated on their respective upper and lower surfaces. These were then rubber-pressed and cut in a predetermined dimension, to form ceramic body forming bodies. Subsequently, the prepared ceramic body forming bodies were fired at a temperature of 1250 to 1280° C. in a reducing atmosphere, followed by barrel polishing. Then, copper external electrodes were formed at end surfaces, resulting in chip-type electronic components as shown in FIGS. 1 and 2. The shapes of the ceramic bodies in the obtained respective electronic components are shown in Table 1.

By changing the area on which conductor patterns were printed in the interior, color tone which emerged on the side surfaces of the ceramic body was adjusted. Note that Sample No. I-8, a comparative example, was obtained by laminating only the green sheets of the pattern D.

The prepared chip-type electronic components were evaluated in terms of color tone difference, expansion coefficient, radius of curvature and breaking strength, in the following method. Table 1 presents the evaluation results. Provided that every evaluation employed 10 samples.

[Color Tone Difference]

The color tone difference between the surface in the laminate direction of the ceramic body (the surface 9*a* in FIG. 1) and the side surface (the surface 9*b* in FIG. 1) was evaluated with a color-difference meter. When the color tone difference is not less than 20%, it was defined as a color tone difference.

[Expansion Coefficient]

As shown in FIG. 4, the expansion coefficient x1 in the laminate direction was expressed by the following expression: $x1=\{(a1-b1)/b1\}\times100$, wherein a1 was a maximum length in the laminate direction of the conductor layer in the ceramic body; and b1 is a length in the laminate direction on the side surface of the ceramic body, to which the conductor layer was not exposed. The expansion coefficient y in a direction vertical to the laminate direction was expressed by the following expression: $y=\{(d-c)/c\}\times100$, wherein d was a minimum length in a width direction in the direction in which the conductor part extended and the conductor part of the ceramic body was not exposed; and c is a length between end portions of the ceramic body in the same direction. In this evaluation, when the coefficients of expansion of both surfaces were respectively measured, a mean value of these was employed as an expansion coefficient.

[Radius of Curvature]

To find the radius of curvature r1, a photograph of the polished cross-section of the prepared ceramic body was taken with an electron microscope, and using the photograph, measurement was conducted with a compass.

[Breaking Strength]

Breaking strength was measured on an autograph.

TABLE 1

| | Shape of ceramic body | | | | Expansion coefficient in a laminate direction *3 % | Expansion coefficient in a width direction *4 % | Radius of curvature | | Breaking strength MPa |
|---|---|---|---|---|---|---|---|---|---|
| Sample No. | Curved surface | Dimension *2 mm³ | Number of laminated layers Layer | Color tone difference *1 | | | Upper and lower surface mm | Side surface mm | |
| I-1 | Upper, lower and side surfaces in a laminate direction | 2 × 1 × 1.8 | 50 | Exist | 5.5 | −5.1 | 5.2 | 55 | 555 |
| I-2 | Upper, lower and side surfaces in a laminate direction | 2 × 1 × 1.8 | 100 | Exist | 5.6 | −5.2 | 4.5 | 49 | 521 |
| I-3 | Upper, lower and side surfaces in a laminate direction | 2 × 1 × 1.8 | 300 | Exist | 5.9 | −5.3 | 4.6 | 48 | 501 |
| I-4 | Upper and lower surfaces in a laminate direction | 2 × 1 × 1.8 | 100 | Exist | 5.1 | — | 5 | — | 430 |
| I-5 | Upper, lower and side surfaces in a laminate direction | 3 × 2 × 1.8 | 100 | Exist | 4.3 | −3.2 | 8 | 86 | 489 |
| I-6 | Upper, lower and side surfaces in a laminate direction | 2 × 1 × 1.8 | 100 | Not exist | 5.2 | −5 | 4 | 49 | 500 |
| I-7 | Upper, lower and side surfaces in a laminate direction | 2 × 1 × 1.8 | 100 | Exist | 2.6 | −1.2 | 6 | 59 | 460 |
| *I-8 | Nothing | 2 × 1 × 1.8 | 100 | Exist | 0 | 0 | — | — | 390 |

Sample marked '*' is out of the scope of the present invention.
*1: Color tone difference between upper and side surfaces
*2: Length in the direction of external electrode × width × thickness
*3: x1 = {(a1 − b1)/b1} × 100
*4: y = [(d − c)/c] × 100

As apparent from Table 1, in Samples Nos. I-1 to I-7, in which at least one surface of the ceramic body was a curved surface, their breaking strengths were not less than 430 MPa. Particularly in Sample Nos. I-1 to I-3 and I-5 to I-7, in which the opposing surfaces of the ceramic body were concavely and convexly curved, their breaking strengths were not less than 460 MPa. Further in Sample Nos. I-1 to I-3, and I-6, in which the dimension of the ceramic body was 2×1×1.8 mm³, the expansion coefficient in the laminate direction was not less than 5%, the expansion coefficient in the width direction was not less than −5% (when designated by a minus sign, the magnitude is determined from its absolute value), and the radius of curvature was not more than 52 mm for the upper and lower surfaces and not more than 55 mm for the side surface, their breaking strength were not less than 500 MPa. Whereas in Sample No. I-8, in which both coefficients of expansion in the laminate direction and the width direction were zero (the radius of curvature could not be measured), the breaking strength was as low as 390 MPa.

In Sample Nos. I-1 to I-3, and I-5 to I-7, each having a curved surface, the area of the ceramic body surface was increased than Sample No. I-8, the entire surface of which was flat. This enables at least not less than 1.1 times print size, thereby improving the visibility of the chip component.

EXAMPLE II

[Preparation of Chip-Type Electronic Component]

Figure 10:
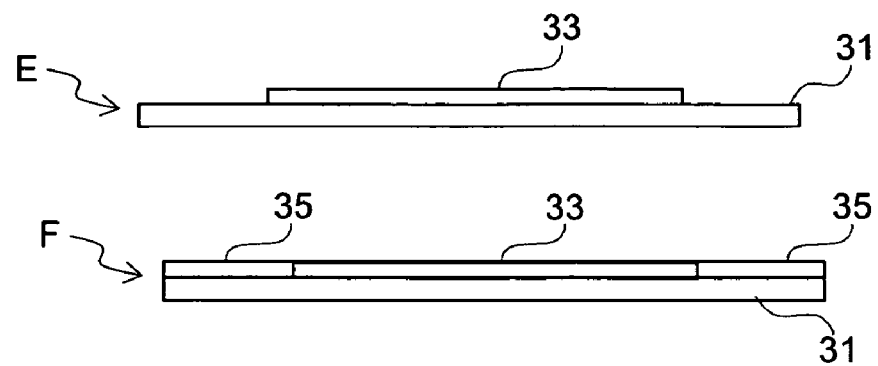
FIGS. 10(a), 10(b) and 10(c) are schematic diagrams showing a method of manufacturing a chip-type electronic component according to the second preferred embodiment of the present invention.
Figure 10:
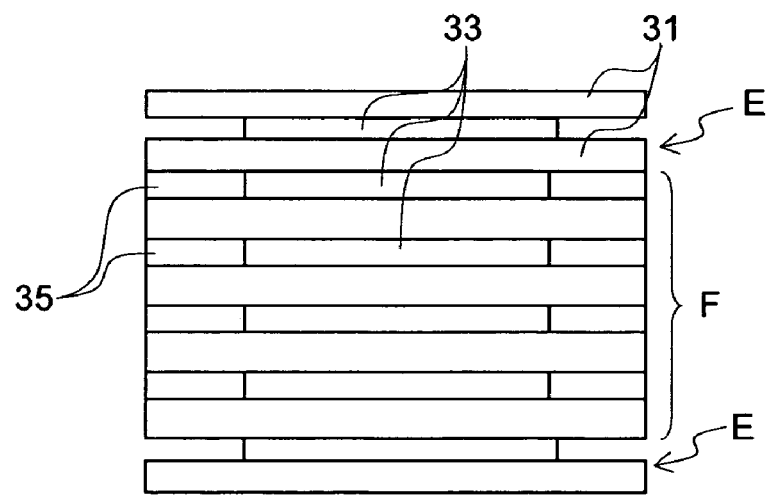
Figure 10:
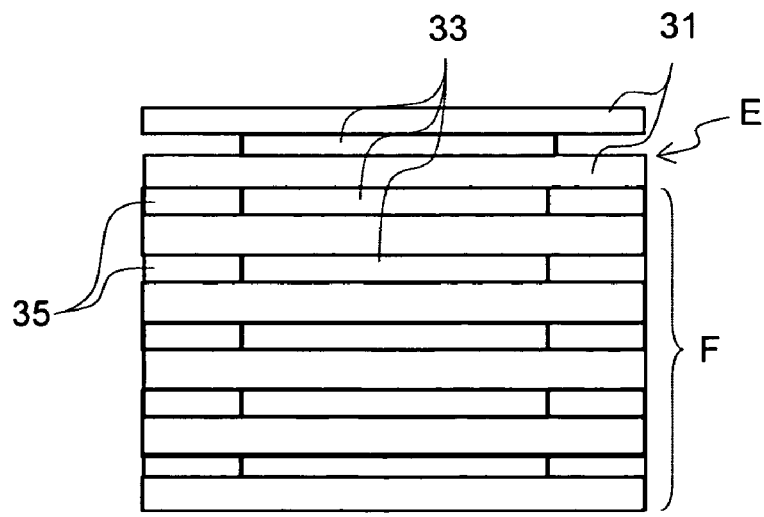

A chip-type electronic component, which basically had the structure shown in FIG. 6, was prepared and then evaluated. First, in the same manner as Example 1, there were prepared dielectric green sheets of the patterns E and F, as shown in FIGS. 10 (*a*) to (*c*).

Subsequently, the green sheets of the patterns E and F were laminated to obtain a variety of forms, and a smaller number of dielectric green sheets than in Example 1, on which no conductor pattern was printed, were laminated on their respective upper and lower surfaces, followed by rubber press. Thereafter, these were cut in a predetermined dimension, thereby obtaining ceramic body forming bodies. In the same manner as Example 1, firing, barrel polishing, and external electrode formation were performed to prepare chip-type electronic components, as shown in FIGS. 6 and 7. Table 2 shows the shapes of the ceramic bodies in the obtained respective electronic components.

Sample No. II-8, which was a comparative example, was obtained by laminating only the green sheets of the pattern F.

The prepared chip-type electronic components were evaluated in terms of color tone difference, expansion coefficient x2 in the laminate direction, radius of curvature r2 and breaking strength, in the same manner as in Example 1. Table 2 presents the evaluation results. Provided that every evaluation employed 10 samples.

TABLE 2

| Sample No. | Shape of ceramic body | | | Expansion coefficient in a laminate direction *3 % | Radius of curvature Upper and lower surfaces mm | Breaking strength MPa |
|---|---|---|---|---|---|---|
| | Curved surface | Dimension *2 mm$^3$ | Number of laminated layers Layer | Color tone difference *1 | | |
| II-1 | Upper and lower surfaces in a laminate direction | 1 × 1 × 0.8 | 50 | Exist | 5.5 | 4.9 | 791 |
| II-2 | Upper and lower surfaces in a laminate direction | 1 × 1 × 0.8 | 100 | Exist | 5.6 | 4.7 | 756 |
| II-3 | Upper and lower surfaces in a laminate direction | 1 × 1 × 0.8 | 300 | Exist | 5.9 | 4.6 | 711 |
| II-4 | Only upper surface in a laminate direction | 1 × 1 × 0.8 | 100 | Exist | 5.1 | 3.8 | 654 |
| II-5 | Upper and lower surfaces in a laminate direction | 2 × 1 × 0.8 | 100 | Exist | 5.6 | 4.7 | 522 |
| II-6 | Upper and lower surfaces in a laminate direction | 1 × 1 × 0.8 | 100 | Not exist | 5.2 | 4.2 | 703 |
| II-7 | Upper and lower surfaces in a laminate direction | 1 × 1 × 0.8 | 100 | Exist | 2.6 | 2 | 460 |
| *II-8 | Nothing | 1 × 1 × 0.8 | 100 | Exist | 0 | — | 400 |

Sample marked '*' is out of the scope of the present invention.
*1: Color tone difference between upper and side surfaces
*2: Length in the direction of external electrode × width × thickness
*3: x2 = {(a2 − b2)/b2} × 100

As apparent from Table 2, in Sample Nos. II-1 to II-7 of the present invention, in which the ceramic body surface was curved, their breaking strengths were not less than 460 MPa. Further in Sample Nos. II-1 to II-6, in which the expansion coefficient in the laminate direction was not less than 5.1, and the radius of curvature was 4.2 to 4.9 mm, their breaking strengths were not less than 522 MPa. For the same number of multilayers, samples having a thin cover layer and a color tone difference had a lower breaking strength than samples having no color tone difference.

Whereas in Sample No. II-8, in which the expansion coefficient in the laminate direction was zero (the radius of curvature could not be measured), namely, not according to the present invention, the breaking strength was as low as 400 MPa.

In Sample Nos. II-1 to II-7, each having a curved surface, the area of the ceramic body surface was increased than Sample No. II-8, the entire surface of which was flat. This enables at least not less than 1.1 times print size, thereby improving the visibility of the chip component.

EXAMPLE III

[Preparation of Chip-Type Electronic Component]

A chip-type electronic component, which basically had the structure shown in FIG. 11, was prepared and then evaluated. First, in the same manner as Example 1, there were prepared dielectric green sheets of the patterns G and H, as shown in FIGS. 13 (a) and (b).

Subsequently, the green sheets of the patterns G and H were laminated to obtain a variety of forms, and dielectric green sheets, on which no conductor patter was printed, were laminated on their respective upper and lower surfaces, followed by rubber press. Thereafter, these were cut in a predetermined dimension, thereby obtaining ceramic body forming bodies. In the same manner as Example 1, the forming bodies were fired, followed by barrel polishing. Then, copper external electrodes were formed on both end surfaces in the thickness indicated in Table 3, to prepare chip-type electronic components, as shown in FIGS. 11 and 12. Here, the thickness of the external electrodes was adjusted depending on the viscosity of copper paste. In Table 3, the thickness of the external electrodes means the value by the expression: (t0−t1)/2 in FIG. 11.

Sample No. III-8, which was a comparative example, was obtained by laminating only the green sheets of the pattern H. Sample No. III-7, in which the upper and lower surfaces of the ceramic body were made flat, was formed in such a shape, because of less influence by the gap in internal conductors.

The prepared chip-type electronic components were evaluated in terms of color tone difference, radius of curvature r3, and breaking strength, in the same manner as in Example 1. In addition, the expansion coefficient x3 in the laminate direction, and a drop test were evaluated in the following manner. Table 3 presents the evaluation results. Provided that every evaluation employed 10 samples.

[Expansion Coefficient in Laminate Direction]

As shown in FIG. 11, the expansion coefficient x3 in the laminate direction of the ceramic body was expressed by the following expression: x3={(t−t1)/t1}×100, wherein t was a maximum length in the laminate direction in the vicinity of the central part in a surface vertical to the direction in which an internal electrode extended; and t1 was a length in the laminate direction at the end portion of the ceramic body. In this evaluation, when the opposing surfaces were measured, the two measured values were averaged.

[Drop Test]

In the drop test, the samples were dropped from a height of 1 m onto a concrete block, and the states of the external electrodes after drop were observed to evaluate the presence or absence of breakage and crack.

TABLE 3

Figure 14:
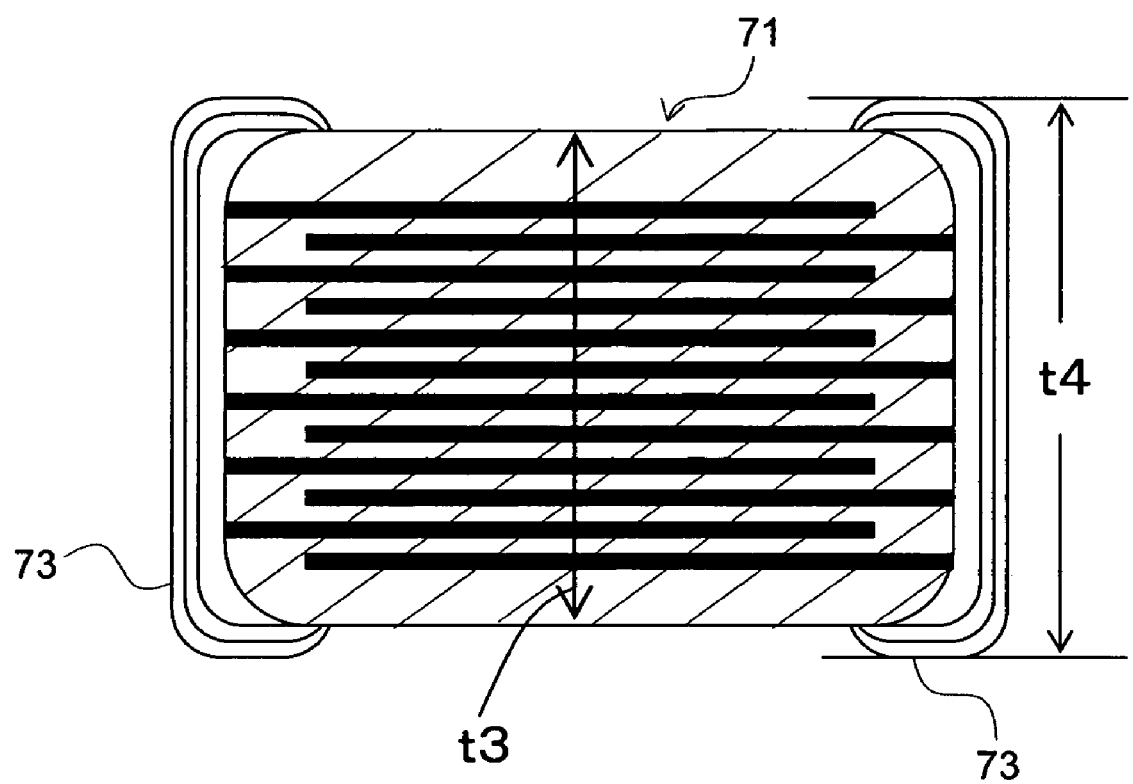
FIG. 14 is a schematic sectional view showing a conventional multilayer ceramic capacitor.

| Sample No. | Ceramic body Shape | Ceramic body Dimension *2 mm³ | Ceramic body Number of laminated layers Layer | Ceramic body Thickness of external electrode μm | Ceramic body Relation-ship of t and t0 *5 | Ceramic body Color tone difference *1 | Expansion coefficient in a laminate direction *3 % | Radius of curvature Upper and lower surfaces mm | Breaking strength MPa | Fraction defective *6 % |
|---|---|---|---|---|---|---|---|---|---|---|
| III-1 | FIG. 11 | 3 × 2 × 1.8 | 50 | 4 | t > t0 | Not exist | 4.5 | 89 | 236 | 0 |
| III-2 | FIG. 11 | 3 × 2 × 1.8 | 100 | 4 | t > t0 | Exist | 4.7 | 68 | 211 | 0 |
| III-3 | FIG. 11 | 3 × 2 × 1.8 | 300 | 4 | t > t0 | Exist | 5 | 56 | 190 | 0 |
| III-4 | FIG. 11 | 2 × 1 × 1.8 | 100 | 4 | t > t0 | Exist | 5.1 | 50 | 266 | 0 |
| III-5 | FIG. 11 | 2 × 1 × 1.8 | 100 | 4 | t > t0 | Exist | 5.2 | 49 | 259 | 0 |
| III-6 | FIG. 11 | 2 × 1 × 1.8 | 100 | 6 | t < t0 | Exist | 5.4 | 48 | 187 | 0.1 |
| III-7 | Upper and lower surfaces are flat *4 | 2 × 1 × 1.8 | 20 | 4 | t < t0 | Not exist | 1.8 | 98 | 155 | 0.3 |
| *III-8 | FIG. 14 | 2 × 1 × 1.8 | 100 | 4 | t < t0 | Exist | 0 | — | 132 | 0.8 |

Sample marked '*' is out of the scope of the present invention.
*1: Color tone difference between upper and side surfaces
*2: Length in the direction of external electrode × width × thickness
*3: x3 = {(t − t1)/t1} × 100
*4: Upper and lower surfaces are not curved, and thickness t1 only in the end portion of external electrode forming part is small.
*5: 't' is thickness in the laminate direction of electronic component body, and 't0' is width of external electrode in the same direction.
*6: Fraction defective of external electrode in drop test As apparent from Table 3, in Sample Nos. III-1 to III-7, their breaking strengths were not less than 155 MPa, and their fraction defectives in the drop test were not more than 0.3%.

In Sample Nos. III-1 to III-6, in which the expansion coefficient in the laminate direction was not less than 5, and the radius of curvature was not more than 89 mm, their breaking strengths were not less than 187 MPa, and their fraction defectives in the drop test were not more than 0.1%. Further, in Sample Nos. III-1 to III-4, in which the thickness of the external electrodes was 4 mm, and the thickness t in the laminate direction of the ceramic body was greater than the width t0 of the external electrode in the same direction, their breaking strengths were further improved, and their fraction defectives in the drop test were lowered. Whereas in Sample No. III-8, in which the expansion coefficient in the laminate direction was zero (the radius of curvature could not be measured), namely, not according to the present invention, the breaking strength was as low as 132 MPa, and the fraction defective in the drop test was as high as 0.8%.

In Sample Nos. III-1 to III-7, the area of the ceramic body surface was increased compared to Sample No. III-8, the entire surface of which was flat as has been conventional. This enables at least not less than 1.1 times print size, thereby improving the visibility of the chip component.

What is claimed is:

1. A chip-type electronic component comprising a ceramic body having at its interior a conductor part,
   wherein the ceramic body is an approximately rectangular solid;
   at least one surface in a thickness direction of the ceramic body is a convexly curved surface;
   side surfaces of the ceramic body are concavely curved surfaces:
   an expansion coefficient in a thickness direction and an expansion coefficient in a width direction are greater than 5% in absolute value; and
   the radius of curvature r1 of the convexly curved surface is not more than 8 mm.

2. The chip-type electronic component according to claim 1, wherein
   the ceramic body has a volume of not more than 8 mm³; and
   the radius of curvature r11 of the concavely curved surfaces is not more than 50 mm.

3. The chip-type electronic component according to claim 1, wherein a convexly curved surface is formed by changing thickness along a width direction of the ceramic body.

4. A chip-type electronic component comprising a ceramic body having at its interior a conductor part,
   wherein only one surface in a thickness direction of the ceramic body is a convexly curved surface;
   an expansion coefficient in a thickness direction is greater than 5%; and
   the radius of curvature r2 of the convexly curved surface is not more than 5 mm.

5. The chip-type electronic component according to claim 4,
   wherein the ceramic body has a volume of not more than 1 mm³.

6. The chip-type electronic component according to claim 1 or 4, wherein the curved surface has a different color tone from other surface.

7. The chip-type electronic component according to claim 1 or 4, wherein the ceramic body comprises a plurality of insulating layers composed of ceramic, and conductor parts, the insulating layers and the conductor parts being alternately laminated.

8. The chip-type electronic component according to claim 1, wherein breaking strength is not less than 500 MPa.

9. The chip-type electronic component according to claim 4, wherein breaking strength is not less than 522 MPa.

10. A chip-type electronic component comprising:
    a ceramic body comprising a plurality of insulating layers composed of ceramic, and conductor layers, which are alternately laminated; and
    a pair of external electrodes that are formed on both end surfaces of the ceramic body and alternately connected to the conductor layers, wherein the thickness in the laminate direction between the external electrodes is gradually increased from the end surface to the central part; the ceramic body is curved so that a thickness in a laminate direction at the central part between the external electrodes is greater than a thickness on the end surface part; an expansion coefficient in a thickness direction is greater than 5%; and the relationship of t>t0 is satisfied wherein t is a maximum thickness in a laminate direction of the ceramic body; and t0 is a maximum width of the external electrodes in the same direction as the laminate direction of the ceramic body.

11. The chip-type electronic component, according to claim 10, wherein the ceramic body has a volume of not more than 8 mm$^3$.

12. The chip-type electronic component according to claim 10, wherein the external electrodes have a thickness of not less than 5 μm.

* * * * *